US007929715B2

(12) United States Patent
Na

(10) Patent No.: US 7,929,715 B2
(45) Date of Patent: Apr. 19, 2011

(54) ULTRA DIRECTIONAL SPEAKER SYSTEM AND SIGNAL PROCESSING METHOD THEREOF

(75) Inventor: Kyungmin Na, Namyangju-si (KR)

(73) Assignee: Sonicast Inc. (KR)

( * ) Notice: Subject to any disclaimer, the term of this patent is extended or adjusted under 35 U.S.C. 154(b) by 1182 days.

(21) Appl. No.: 11/558,489

(22) Filed: Nov. 10, 2006

(65) Prior Publication Data

US 2007/0121968 A1 May 31, 2007

(30) Foreign Application Priority Data

Nov. 21, 2005 (KR) ........................ 10-2005-0111146

(51) Int. Cl.
*H04R 3/00* (2006.01)
*H04B 3/00* (2006.01)

(52) U.S. Cl. ........................................ 381/111; 381/77

(58) Field of Classification Search .................. 381/111, 381/77, 94.1, 71.11, 71.12, 3, 6, 14, 16, 98, 381/103
See application file for complete search history.

(56) References Cited

U.S. PATENT DOCUMENTS 4,006,313 A 2/1977 Matsudaira et al.
6,573,948 B1 * 6/2003 Limberg ........................ 348/614
6,584,205 B1 6/2003 Croft, III et al.
7,054,359 B2 * 5/2006 Kennedy et al. .............. 375/232

FOREIGN PATENT DOCUMENTS

EP 1 061 770 A2 12/2000
JP 2003-507982 A 2/2003
JP 2003-299180 A 10/2003
WO 0115491 A1 3/2001
WO 03/079572 A1 9/2003

OTHER PUBLICATIONS

Search Report issued by the EPO to the EP Application No. 06123564.4; filed Nov. 7, 2006 based on KR Patent Application No. 10-2005-0111146, dated Aug. 24, 2009.

* cited by examiner

*Primary Examiner* — Curtis Kuntz
*Assistant Examiner* — Hai Phan
(74) *Attorney, Agent, or Firm* — Cantor Colburn LLP

(57) ABSTRACT

An ultra directional speaker system and a signal processing method thereof are disclosed. In accordance with the present invention, the pre-distortion compensation may be applied to the input signal in real time and a signal to be modulated is subjected to a VSB modulation to minimize the distortion according to a level of the signal, and a signal difference compensation according to an envelop detection of a current signal and a signal in a previous stage.

12 Claims, 4 Drawing Sheets

ULTRA DIRECTIONAL SPEAKER SYSTEM AND SIGNAL PROCESSING METHOD THEREOF

BACKGROUND OF THE INVENTION

1. Field of the Invention

The present invention relates to an ultra directional speaker system and a signal processing method thereof, and in particular to an ultra directional speaker system and a signal processing method thereof wherein a novel signal processing scheme is employed to improve a sound quality of the speaker system.

2. Description of Prior Art

Generally, a speaker generates a sound by converting an electrical signal to a vibration to be transmitted to an air. The speaker transmits the vibration to the air isotropically. Accordingly, an audience may hear the sound generated by the speaker from all directions with respect to the speaker. The isotrope of the speaker often causes an unnecessary problem. For instance, when various art works or exhibits are displayed in an art gallery or a museum such that a description thereof is provided by the speaker, an interference occurs between sounds generated by the speaker due to a small space of the art gallery and the museum. Moreover, when a number of people listen to the description of different art works or exhibits simultaneously, a large amount of voices are interfered and distorted to be converted to a large amount of noise. In order to solve above-described problem, an ultra directional speaker wherein the sound is reproduced such that the sound is audible in a certain direction has been proposed.

A conventional ultra directional speaker employs a parabolic dish. In accordance with the parabolic ultra directional speaker, a general speaker is disposed at a focus of the parabolic dish such that an acoustic output of the speaker is reflected and travels straight. Since the parabolic ultra directional speaker is frequently used in the museum, the parabolic ultra directional speaker is known as a museum speaker. However, in accordance with the conventional ultra directional speaker using the parabolic dish, a sound quality thereof is poor and a diameter of the parabolic dish is relatively large. And also a distance for a travel of the sound with a direction is only 10 m in the conventional ultra directional speaker.

Therefore, an ultrasonic speaker technology using a non-linear interference of an ultrasonic wave in the air is applied to an embodiment of the ultra directional speaker. While the ultrasonic speaker technology has been developed from 1960s, a commercialization thereof has been delayed until recent years due to a slow development of peripherals and an industrial margin.

The ultra directional speaker comprises a signal processor for obtaining a proper sound quality, a modulator for efficiently modulating a processed signal to an ultrasonic band, an ultrasonic amplifier for driving an ultrasonic converter, and a ultrasonic converter for actually generating an ultrasonic wave in the air. Theoretically, an audible signal p(t) demodulated in the air is proportional to a second-order differentiated square of an envelop signal E(t) of an amplitude-modulated signal as expressed in equation 1, where a is a constant. A second order time partial differentiation in the equation 1 may be solved using 12 dB/octave equalizer, and the according envelop signal E(t) may be expressed as equation 2:

$$p(t)=a\partial^2/\partial t^2\{E(t)^2\} \quad \text{[Equation 1]}$$

$$E(t)=1+mx(t) \quad \text{[Equation 2]}$$

where m is a modulation index and x(t) is an original audible audio signal.

In accordance with the equations, when the audible signal p(t) audible through the speaker is proportional to the original audible audio signal x(t), a reproduction of the audible sound without any distortion is possible. However, the distortion corresponding to the square of original audible audio signal x(t) as expressed in the equation 1 is seriously generated. While the modulation index m is decreased in the conventional ultrasonic speaker to reduce the distortion, a reproduction efficiency is degraded so that a high acoustic output cannot be obtained.

Another method for compensating the distortion is to modulate a square root of the original signal as shown in FIG. 1. Theoretically, in accordance with the method, the original signal is perfectly reproduced. However, a spectrum of the original signal x(t) which has a limited bandwidth due to a non-linear operation of the square root appears in an almost infinite bandwidth. Therefore, unless an ultrasonic converter that reproduces the infinite bandwidth exists, the ultrasonic speaker shown in FIG. 1 has an absolute limitation in reducing the distortion.

In order to solve the problem of the speaker shown in FIG. 1, American Technology Corporation proposed a repetitive error compensation method without increasing a bandwidth titled "Modulator Processing for a Parametric Speaker System" (U.S. Pat. No. 6,584,205) as shown in FIG. 2. In brief, the patent owned by American Technology Corporation discloses a method wherein an ideal modulated signal waveform is calculated through a SSB ("Single Side Band") channel model without a converter and an error is calculated by comparing the ideal signal and the actually modulated signal to compensate the error for a signal prior to the modulation, thereby compensating for the distortion of the sound quality. However, since the patent of American Technology Corporation repeatedly compensates for the error, it is disadvantageous in that a large amount of calculation is required for the repeated error compensation such that a hardware design is complex and a delay according to a signal processing is increased. Moreover, since the patent of American Technology Corporation employs the SSB modulation, a sharp SSB filter should be designed by increasing an order thereof in order to prevent the distortion due to an imperfection of the SSB filter.

SUMMARY OF THE INVENTION

It is an object of the present invention to provide an ultrasonic directional speaker system and a signal processing method thereof wherein a pre-distortion adaptive filter is employed to minimize a distortion of a reproduced signal in real time, and a vestigial sideband ("VSB") modulation is employed to remove an imperfection of the SSB filter, thereby improving a sound quality.

It is another object of the present invention to provide an ultrasonic directional speaker system and a signal processing method thereof wherein an envelop signal of an audio input signal and an envelop signal of a compensated signal having a adaptive filter coefficient of a previous input signal is applied are mutually compared and an adaptive filter coefficient of a current audio input signal is calculated and applied accordingly so that a hardware design is simplified by applying a pre-distortion compensation in real time and improving a sound quality of the ultrasonic speaker.

It is another object of the present invention to provide an ultrasonic directional speaker system and a signal processing method thereof wherein a modulation index of a compensated signal being subjected to a pre-distortion compensation is dynamically modulated when being subjected to a VSB modulation so that a distortion is compensated according to a level of a input signal to minimize a distortion of a signal demodulated by a non-linear modulation in a air, and improve a sound quality of a speaker.

Finally, it is another object of the present invention to provide an ultrasonic directional speaker system and a signal processing method thereof wherein an ultrasonic converter that is applied to a current system is filtered by a predetermined filter and uses a according coefficient to generate a inverse filter model of an ultrasonic converter to be applied to a VSB-modulated signal, thereby minimize a distortion during an ultrasonic conversion of a modulated signal and improve a sound quality.

In order to achieve the above-described objects of the present invention, there is provided an ultra directional speaker system comprising a first envelop calculator for calculating an envelop of an audio input signal currently being inputted; a square root operator for calculating a square root of a first envelop signal calculated by the first envelop calculator to generate a square root signal of the first envelop signal; a pre-distortion adaptive filter for applying an adaptive filter coefficient update term according to an adaptive filter coefficient determined in a previous stage to the audio input signal currently being inputted to carry out a distortion compensation and generate a compensated signal; a second envelop calculator for calculating an envelop the compensated signal to generate a second envelop signal; an error calculator for comparing the second envelop signal and the square root of the first envelop signal to generate an error signal; an adaptive filter coefficient updater for calculating the adaptive filter coefficient update term and the adaptive filter coefficient from the error signal; a dynamic VSB modulator for dynamically modulating the compensated signal to an ultrasonic band to generate a modulation signal; an ultrasonic converter model for modeling a inverse filter corresponding to a frequency characteristic of an ultrasonic converter and applying the inverse filter to the modulation signal to generate a filtering signal; an ultrasonic amplifier for amplifying the filtering signal; and the ultrasonic converter for converting the amplified filtering signal to an ultrasonic signal.

There is also provided an ultra directional speaker system comprising a adaptive filter calculator for comparing an envelop of an audio input signal being currently inputted and an envelop having an adaptive filter coefficient obtained from an audio input signal of a previous stage applied to obtain a current adaptive filter coefficient; a VSB modulator for subjecting the audio signal having the adaptive filter coefficient applied to a VSB modulation; and a ultrasonic converter unit for converting the modulated signal to an ultrasonic wave.

There is also provided a signal processing method of an ultra directional speaker, the method comprising steps of (a) calculating an envelop of an audio input signal currently being inputted to generate a first envelop signal; (b) generating a ideal envelop signal of the first envelop signal; (c) applying an adaptive filter coefficient determined by an audio input signal of a previous stage to generate a compensated signal by subjecting to a pre-distortion compensation; (d) generating an envelop signal of the compensated signal; (e) comparing the ideal envelop signal and the envelop signal of the compensated signal to generate an error signal; (f) calculating an adaptive filter coefficient update term and the adaptive filter coefficient from the error signal; (g) subjecting the compensated signal to a dynamic VSB modulation to generate a modulation signal; (h) filtering the modulation signal with a inverse filter corresponding to an ultrasonic converter; (i) subjecting the filtered signal to an ultrasonic amplification; and (j) converting the amplified filtering signal to an ultrasonic signal.

DESCRIPTION OF REFERENCE NUMERALS

Figure 1:
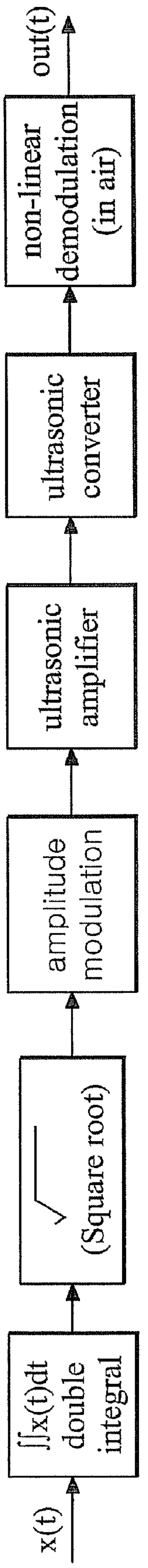
FIG. 1 Prior Art
FIG. 1 is a diagram illustrating a conventional signal processing method of an audio input signal using a square root modulation scheme in an ultrasonic speaker system.
Figure 2:
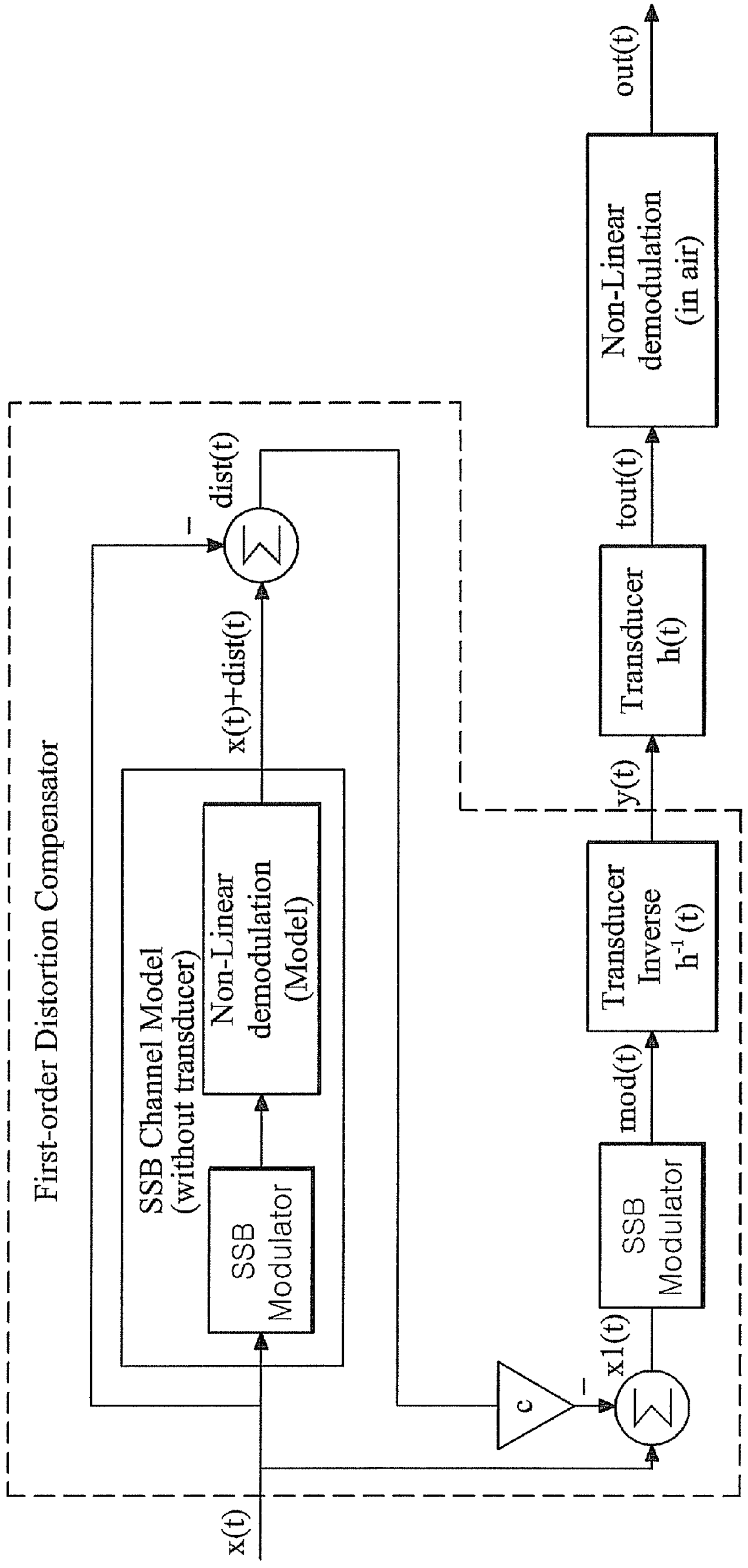
FIG.2 Prior Art
FIG. 2 is a diagram illustrating a conventional signal processing method of an audio input signal according to an SSB modulation and a recursion in an ultrasonic speaker system.

10, 40: envelop calculator
20: square root operator
30: pre-distortion adaptive filter
50: error calculator
60: adaptive filter coefficient updater
70: dynamic VSB modulator
80: ultrasonic converter model
90: ultrasonic amplifier
100: ultrasonic converter

DETAILED DESCRIPTION OF THE PREFERRED EMBODIMENTS

The present invention will be described more fully hereinafter with reference to the accompanying drawings, in which preferred and exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

The present invention will now be described in detail with reference to the accompanied drawings.

Figure 3:
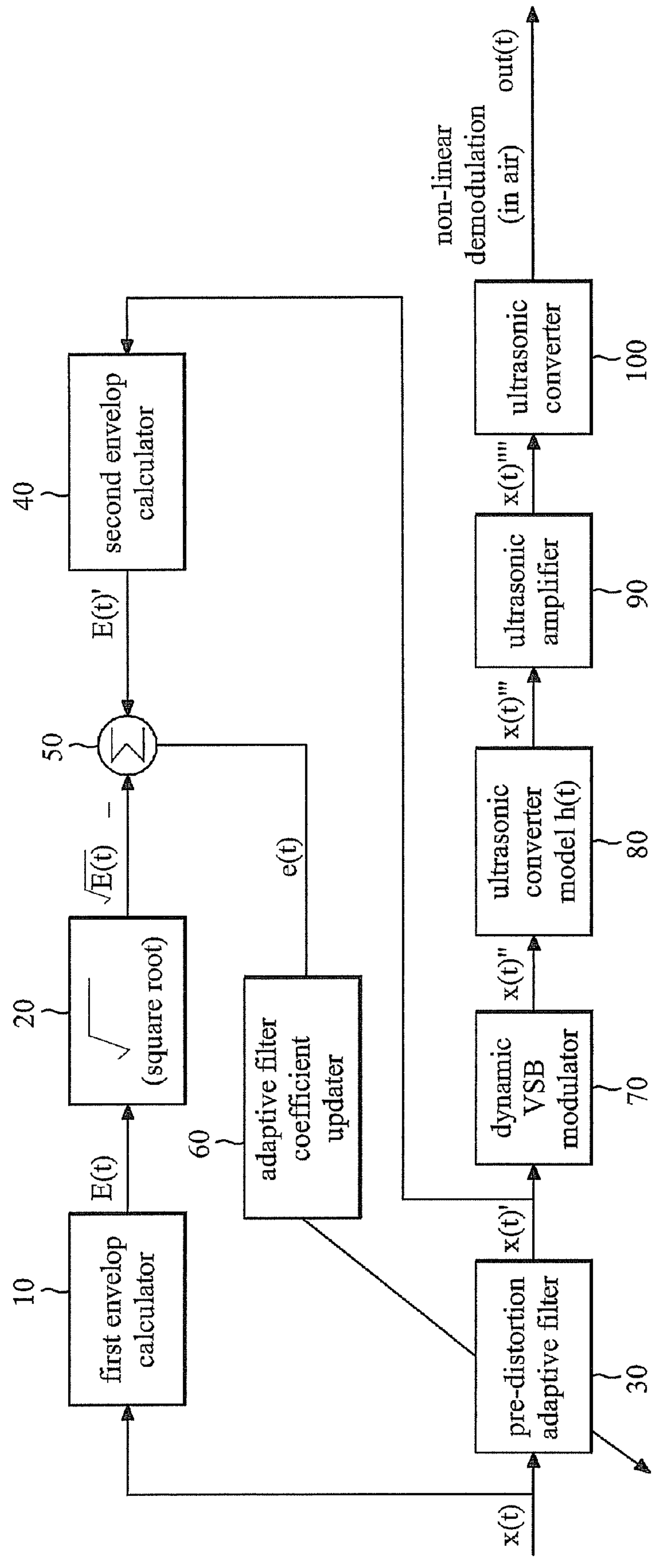
FIG. 3 is a diagram illustrating an ultrasonic directional speaker system in accordance with an embodiment of the present invention.

FIG. 3 is a diagram illustrating an ultrasonic directional speaker system in accordance with an embodiment of the present invention.

Referring to FIG. 3, the ultrasonic directional speaker system in accordance with an embodiment of the present invention comprises a adaptive filter calculator for comparing an envelop of an audio input signal being currently inputted and an envelop having an adaptive filter coefficient obtained from an audio input signal of a previous stage applied to obtain a current adaptive filter coefficient; a VSB modulator for subjecting the audio signal having the adaptive filter coefficient applied to a VSB modulation; and an ultrasonic converter unit for converting the modulated signal to an ultrasonic wave. The adaptive filter calculator comprises a first envelop calculator 10, a square root operator 20, a second envelop calculator 40, an error calculator 50, an adaptive filter coefficient updater 60 and a pre-distortion adaptive filter 30 for applying an adaptive filter coefficient. The VSB modulator comprises a dynamic VSB modulator 70. The ultrasonic converter unit comprises an ultrasonic converter model 80, an ultrasonic amplifier 90 and the ultrasonic converter 100.

That is, the ultrasonic directional speaker system in accordance with an embodiment of the present invention comprises the first envelop calculator 10 for calculating an envelop of an audio input signal x(t) currently being inputted to generate a first envelop signal E(t), the square root operator 20 for calculating an ideal envelop signal $E(t)^{0.5}$ using the first envelop signal E(t) calculated by the first envelop calculator 10, the pre-distortion adaptive filter 30 for applying an adaptive filter coefficient update term calculated from an envelop of an audio input signal x(t−1) of a previous stage to carry out a pre-distortion compensation of the audio input signal x(t) currently being inputted and generate a distortion compensated signal x(t)', the second envelop calculator 40 for calculating an envelop E(t)' of the compensated signal x(t)' outputted from the pre-distortion adaptive filter 30 to generate a second envelop signal E(t)', the error calculator 50 for comparing the square root of the first envelop signal $E(t)^{0.5}$ with the second envelop signal E(t)' to generate an error signal e(t), the adaptive filter coefficient updater 60 for calculating the adaptive filter coefficient update term corresponding to the error signal e(t) to be provided to the pre-distortion adaptive filter 30, the dynamic VSB modulator 70 for dynamically modulating the compensated signal x(t)' outputted from the pre-distortion adaptive filter 30 to an ultrasonic band to generate a modulation signal x(t)", the ultrasonic converter model 80 for modeling a inverse filter h(t) corresponding to a unique frequency characteristic of the ultrasonic converter 100 and applying the inverse filter h(t) to the modulation signal x(t)" to generate a converted signal x(t)"', the ultrasonic amplifier 90 for amplifying the converted signal x(t)"' outputted from the ultrasonic converter model 80 to generated an amplified signal x(t)"", and the ultrasonic converter 100 for converting the amplified signal x(t)"" to an ultrasonic signal.

Prior to a detailed description, since a VSB modulation is similar to an amplitude modulation in a mathematical approach wherein a side band is symmetrically removed in the amplitude modulation in accordance with the VSB modulation, the VSM modulation is substituted with the amplitude modulation with specific equations applied for an effective description of the ultra directional speaker system in accordance with the embodiment of the present invention.

The first envelop calculator 10 calculates the envelop for the current audio input signal x(t). Since the envelop signal E(t) calculated by the first envelop calculator 10 may be defined identical to E(t) of the equations 1 and 2, a detailed description is omitted.

The square root operator 20 calculates the ideal envelop signal $E(t)^{0.5}$ of the envelop signal E(t) calculated by the first envelop calculator 10. Referring to the equation 1, the most ideal signal of a signal generated by the first envelop calculator 10 in view of a numerical formula is a signal corresponding to the square root of the envelop signal E(t). A second order time partial differentiation in the equation 1 may be solved using 12 dB/octave equalizer.

The pre-distortion adaptive filter 30 applies the adaptive filter coefficient $a_m(t)$ calculated by the audio input signal x(t−1) of the previous stage to the audio input signal x(t) currently inputted to output the compensated signal x(t)' as expressed in equation 3, where N is a period.

$$x(t)' = \sum_{m=0}^{N-1} a_m(t)x(t-m)$$ [Equation 3]

The second envelop calculator 40 calculates an envelop E(t)' of the compensated signal x(t)' by subjecting to a pre-distortion compensation by the pre-distortion adaptive filter 30. The envelop signal E(t)' calculated by the second envelop calculator 40 is obtained after subjecting x(t)' to an amplitude modulation as expressed in equation 4.

$$E(t)'=1+mx(t)'$$ [Equation 4]

The error calculator 50 subtracts the signal $E(t)^{0.5}$ calculated by the square root operator 20 from the envelop signal E(t)' calculated by the second envelop calculator 40 to generate the error signal e(t). The error signal e(t) calculated by the error calculator 50 is expressed in equation 5.

$$e(t)=(E(t)'-E(t)^{0.5})^2$$ [Equation 5]

The adaptive filter coefficient updater 60 calculates the adaptive filter coefficient update term $\Delta a_m(t)$ by applying a LMS (Least Mean Square) scheme to the error signal e(t) calculated by the error calculator 50. An RLS (Recursive Least Square) scheme may be applied to a method for calculating the adaptive filter coefficient update term $\Delta a_m(t)$ from the error signal e(t) in accordance with the present invention. A description focused on the LMS scheme will be given below. The update term $\Delta a_m(t)$ calculated by the adaptive filter coefficient updater 60 may be expressed as equation 6.

$$\Delta a_m(t)=-\partial e(t)/\partial a_m(t)=-2(E(t)'-E(t)^{0.5})x(t-m)$$ [Equation 6]

Therefore, the adaptive filter coefficient calculated the adaptive filter coefficient updater 60 and provided to the pre-distortion adaptive filter 30 may be expressed as equation 7:

$$a_m(t+1)=a_m(t)+\beta\Delta a_m(t)$$ [Equation 7]

where β is an adaptive coefficient.

The adaptive coefficient β varies according to time in a normalized LMS scheme to converge stably and rapidly. It is possible to design a stable system by using the adaptive coefficient β.

The pre-distortion adaptive filter 30 applies the update term $a_m(t+1)$ obtained by the adaptive filter coefficient updater 60 to an audio input signal x(t+1) inputted in a next stage in real time. A linear FIR (Finite Impulse Response) filter may be used as the pre-distortion adaptive filter 30 in order to obtain an accurate linear phase characteristic.

The dynamic VSB modulator 70 dynamically modulates the compensated signal x(t)' generated by the pre-distortion adaptive filter 30 to an ultrasonic band, wherein the dynamic VSB modulator 70 carries out the VSB modulation so as to remove most of a portion of an upper side band or a lower side band of the signal x(t)', thereby keeping a perfect side band of a remaining portion and rest of the signal x(t)'. In other words, the dynamic VSB modulator 70 varies the modulation index m according to a signal level of the audio input signal. Since the dynamic VSB modulation removes a signal symmetric to a carrier frequency, entire information is included in a remaining spectrum. Therefore, a phenomenon of a sound quality degradation generated during a demodulation due to an imperfect filter characteristic of SSB may be prevented.

The ultrasonic converter model 80 calculates the inverse filter h(t) according to the ultrasonic converter 100, and the inverse filter h(t) is applied to the modulated signal x(t)'' generated by the dynamic VSB modulator 70 to generate the signal x(t)'''. When the ultrasonic converter 100 is modeled as the FIR filter for example, a coefficient of the filter may be obtained from the frequency characteristic of the ultrasonic converter 100, and the obtained coefficient of the filter may be used to obtain a coefficient of the inverse filter h(t) in advance.

The ultrasonic amplifier 90 radiates an ultrasonic wave generated by an ultrasonic vibrating element to the signal x(t)''' which is the filtered signal filtered by the inverse filter h(t) of the modulated signal x(t)'' modulated by the dynamic VSB modulator 70 to vibrate the signal with a physical energy, whereby the amplitude amplified signal x(t)'''' which is an amplified signal of x(t)''' is generated.

The ultrasonic converter 100 converts the amplitude amplified signal x(t)'''' by the ultrasonic amplifier 90 to the ultrasonic signal. The ultrasonic converter 100 may be a piezoelectric type, a magnetostriction type or a semiconductor type.

A piezoelectric acoustic converting element utilizes a phenomenon wherein an ultrasonic wave is generated from a crystal when a certain high frequency voltage is applied to a plate or a rod cut in a predetermined direction from the crystal such as quartz, for example. The piezoelectric acoustic converting element utilizes an interference phenomenon wherein a frequency of the applied voltage is an odd number of times a fundamental frequency of the crystal of the quartz. That is, the piezoelectric acoustic converting element is an element wherein a proper oscillation is applied to the quartz in order to obtain a certain frequency, thereby referred to as a piezoelectric element due to a fact that the oscillation is generated by applying the voltage.

A principle for generating the ultrasonic wave of the magnetostriction type or the semiconductor type is identical to that of the piezoelectric type, and only differs from the piezoelectric type in a characteristic of a material.

The ultrasonic signal converted by the ultrasonic converter 100 is radiated in an air to be subjected to a non-linear demodulation so as to be outputted as an acoustic audio.

Figure 4:
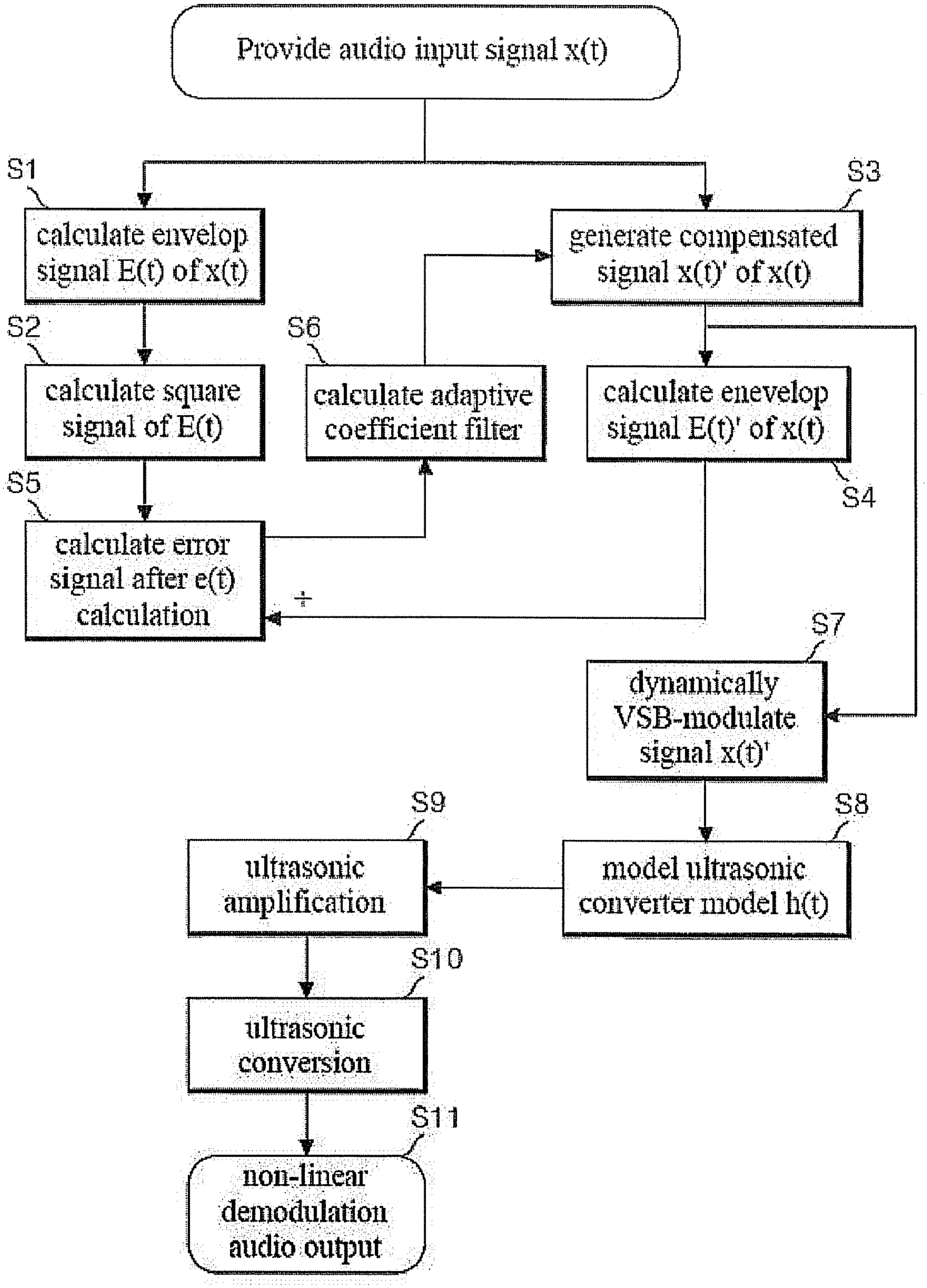
FIG. 4 is a flow diagram illustrating a signal processing method of an ultrasonic directional speaker system in accordance with an embodiment of the present invention.

A signal processing method of the ultrasonic directional speaker system in accordance with the embodiment of the present invention is described below with reference to FIG. 4.

Prior to a detailed description, it should be noted that x(t) denotes the audio input signal currently being inputted, and h(t) denotes the inverse filter of the coefficient calculated by modeling the various ultrasonic converters 100 with the predetermined filter.

In accordance with the signal processing method of the ultrasonic directional speaker system in accordance with the embodiment of the present invention, the envelop of the audio input signal x(t) currently being inputted is calculated (S1), and the signal $E(t)^{0.5}$ is generated (S2) by carrying out a square root operation of the calculated envelop signal E(t).

On the other hand, while the steps S1 and S2 are in progress, the compensated signal x(t)' is generated (S3) by applying the adaptive filter coefficient calculated in the audio input signal x(t−1) of the previous stage to the audio input signal x(t), and the envelop signal E(t)' of the generated signal x(t)' is then calculated (S4). Thereafter, the signals $E(t)^{0.5}$, E(t)' are operated in the step S2 and S4 (S5).

The signal $E(t)^{0.5}$ is subtracted from the envelop signal E(t)' to generate the error signal e(t).

Thereafter, the adaptive filter coefficient updater 60 calculates the update term according to the error signal e(t) (S6).

In order to calculate the update term, the pre-distortion adaptive filter 30 employs at least one of the LMS (Least Mean Square) scheme and the RLS scheme.

Thereafter, the audio input signal x(t+1) inputted in the next stage is subjected to the pre-distortion compensation using the update term of the error signal e(t) (S3).

In accordance with the step S3, the distortion compensated signal x(t)' having the adaptive filter coefficient calculated by the audio input signal x(t−1) of the previous stage applied is subjected to the dynamic VSB modulation to generate the signal x(t)" (S7).

Thereafter, the inverse filter h(t) of the ultrasonic converter model is applied to the VSB-modulated signal x(t)" (S8).

The inverse filter h(t) may be obtained by modeling the ultrasonic converter 100 used in the system with the predetermined filter.

Next, the ultrasonic amplifier 90 ultrasonically amplifies the filtered signal x(t)'" filtered by the inverse filter h(t) (S9).

Thereafter, the ultrasonic converter 100 converts the amplified signal to the ultrasonic wave (S10).

Finally, the ultrasonic signal is subjected to a non-linear demodulation in an air to convert the ultrasonic signal to an acoustic audio signal out(t) (S11).

The ultrasonic directional speaker system in accordance with the embodiment of the present invention utilizes the adaptive filter to provide the signal that is compensated by the pre-distortion compensation, thereby applying the compensation for the distortion non-repeatedly and in real time. Therefore, in accordance with the ultrasonic directional speaker system according to the embodiment of the present invention, a delay generated due to the compensation for the distortion is minimized, and a hardware design may be simplified, thereby facilitating a building of the system providing an effective modulation.

That is, in accordance with the ultrasonic directional speaker system according to the embodiment of the present invention, the pre-distortion adaptive filtering is used to compensate the audio input signal in real time, thereby allowing the pre-distortion prior to the modulation so that an audible signal secondarily reproduced by being radiated in the air from the ultrasonic converter is close to an original audio input signal. In addition, by using the linear FIR filter, the pre-distorted signal is modified within an original bandwidth, and the hardware design is simplified. Moreover, in accordance with the ultrasonic directional speaker system according to the embodiment of the present invention, the VSB modulation is used to filter an information in a low frequency band of the original signal without an overlapping by a symmetric filter, thereby improving the sound quality compared to the SSB modulation wherein a non-ideal non-symmetric filter is used, and achieving the highly efficient modulation by dynamically varying the modulation index according to the level of the input signal.

As described above, in accordance with the ultrasonic directional speaker system and the signal processing method thereof according to the embodiment of the present invention, the pre-distortion adaptive filter is employed to minimize the distortion of a reproduced signal in real time, and the VSB modulation is employed to remove the imperfection of the SSB filter, thereby improving the sound quality.

In accordance with the ultrasonic directional speaker system and the signal processing method thereof according to the embodiment of the present invention, the envelop signal of the audio input signal and the envelop signal of the compensated signal having the adaptive filter coefficient of the previous input signal is applied are mutually compared and the adaptive filter coefficient of the current audio input signal is calculated and applied accordingly so that the hardware design is simplified by applying the pre-distortion compensation in real time and improving the sound quality of the ultrasonic speaker.

In accordance with the ultrasonic directional speaker system and the signal processing method thereof according to another embodiment of the present invention, the modulation index of the compensated signal being subjected to the pre-distortion compensation is dynamically modulated when being subjected to the VSB modulation so that the distortion is compensated according to the level of the input signal to minimize the distortion of the signal demodulated by the non-linear modulation in the air, and improve the sound quality of the speaker.

Finally, in accordance with the ultrasonic directional speaker system and the signal processing method thereof according to another embodiment of the present invention, the ultrasonic converter that is applied to the current system is filtered by the predetermined filter and uses the according coefficient to generate the inverse filter model of the ultrasonic converter to be applied to the VSB-modulated signal, thereby minimize the distortion during the ultrasonic conversion of the modulated signal and improve the sound quality.

While the present invention has been particularly shown and described with reference to the preferred embodiment thereof, it will be understood by those skilled in the art that various changes in form and details may be effected therein without departing from the spirit and scope of the invention.

The invention claimed is:

1. An ultra directional speaker system comprising:

a first envelop calculator which calculates an envelop of an audio input signal currently being inputted;

a square root operator which calculates a square root of a first envelop signal calculated by the first envelop calculator to generate a square root signal of the first envelop signal;

a pre-distortion adaptive filter which applies an adaptive filter coefficient update term according to an adaptive filter coefficient determined in a previous stage to the audio input signal currently being inputted to carry out a distortion compensation and generate a compensated signal;

a second envelop calculator which calculates an envelop the compensated signal to generate a second envelop signal;

an error calculator which compares the second envelop signal and the square root signal of the first envelop signal to generate an error signal;

an adaptive filter coefficient updater which calculates the adaptive filter coefficient update term and the adaptive filter coefficient from the error signal;

a dynamic vestigial sideband modulator which dynamically modulates the compensated signal to an ultrasonic band to generate a modulation signal;

an ultrasonic converter model which models an inverse filter corresponding to a frequency characteristic of an ultrasonic converter and applies the inverse filter to the modulation signal to generate a filtering signal;

an ultrasonic amplifier which amplifies the filtering signal; and the ultrasonic converter which converts the amplified filtering signal to an ultrasonic signal.

2. The system in accordance with claim 1, wherein the compensated signal x(t)' is expressed as $$x(t)' = \sum_{m=0}^{N-1} a_m(t)x(t-m);$$

the second envelop signal E(t)' obtained by subjecting the compensated signal x(t)' to an amplitude modulation is expressed as $$E(t)'=1+mx(t)';$$

the error signal e(t) is expressed as $$e(t)=(E(t)'-E(t)^{0.5})^2;$$

the adaptive filter coefficient update term $\Delta a_m(t)$ is expressed as $$\Delta a_m(t)=-e(t)/a_m(t)=-2(E(t)'-E(t)^{0.5})x(t-m); \text{ and}$$

the adaptive filter coefficient $a_m(t+1)$ is expressed as $$a_m(t+1)=a_m(t)+\beta\Delta a_m(t),$$

where the audio input signal is x(t), the first envelop signal is E(t), $a_m(t)$ is the adaptive filter coefficient of the previous stage, m is a modulation index and, β is an adaptive coefficient.

3. The system in accordance with claim 2, wherein the dynamic vestigial sideband modulator dynamically varies the modulation index according to a signal level being inputted.

4. The system in accordance with claim 1, wherein at least one of an least mean square type or a recursive least square type is applied to the adaptive filter coefficient updater.

5. The system in accordance with claim 1, wherein the adaptive pre-distortion filter comprises a linear finite impulse response filter.

6. The system in accordance with claim 1, wherein the inverse filter is pre-calculated using the frequency characteristic of the ultrasonic converter obtained by modeling the ultrasonic converter with a predetermined filter.

7. The system in accordance with claim 6, wherein the predetermined filter comprises a finite impulse response filter.

8. An ultra directional speaker system comprising:

an adaptive filter calculator which compares an envelop of an audio input signal being currently inputted and an envelop having an adaptive filter coefficient obtained from an audio input signal of a previous stage, the adaptive filter calculator comprising:

a first envelop calculator which calculates the envelop of the audio input signal currently being inputted;

a square root operator which calculates a square root of a first envelop signal calculated by the first envelop calculator to generate a square root signal of the first envelop signal;

a pre-distortion adaptive filter which applies an adaptive filter coefficient update term according to the adaptive filter coefficient determined in the previous stage to the audio input signal currently being inputted to carry out a distortion compensation and generate the compensated signal;

a second envelop calculator which calculates an envelop the compensated signal to generate a second envelop signal;

an error calculator for comparing the second envelop signal and the square root signal of the first envelop signal to generate an error signal; and an adaptive filter coefficient updater which calculates the adaptive filter coefficient update term and the adaptive filter coefficient from the error signal, wherein the vestigial sideband modulator dynamically modulates the compensated signal to an ultrasonic band to generate a modulation signal, and wherein the ultrasonic converter unit comprises:

an ultrasonic converter model which models an inverse filter corresponding to a frequency characteristic of an ultrasonic converter and applies the inverse filter to the modulation signal to generate a filtering signal;

an ultrasonic amplifier which amplifies the filtering signal; and the ultrasonic converter which converts the amplified filtering signal to an ultrasonic signal;

a vestigial sideband modulator which subjects a compensated audio signal having the adaptive filter coefficient; and an ultrasonic converter unit which converts the modulated signal to an ultrasonic wave.

9. A signal processing method of an ultra directional speaker, the method comprising steps of:

(a) calculating an envelop of an audio input signal currently being inputted to generate a first envelop signal;

(b) generating an ideal envelop signal of the first envelop signal;

(c) applying an adaptive filter coefficient determined by an audio input signal of a previous stage to generate a compensated signal by subjecting to a pre-distortion compensation;

(d) generating an envelop signal of the compensated signal;

(e) comparing the ideal envelop signal and the envelop signal of the compensated signal to generate an error signal;

(f) calculating an adaptive filter coefficient update term and the adaptive filter coefficient from the error signal;

(g) subjecting the compensated signal to a dynamic vestigial sideband modulation to generate a modulation signal;

(h) filtering the modulation signal with an inverse filter corresponding to an ultrasonic converter;

(i) subjecting the filtered signal to an ultrasonic amplification; and (j) converting the amplified filtering signal to an ultrasonic signal.

10. The method in accordance with claim 9, wherein the compensated signal x(t)' is expressed as $$x(t)' = \sum_{m=0}^{N-1} a_m(t)x(t-m);$$

the second envelop signal E(t)' obtained by subjecting the compensated signal x(t)' to an amplitude modulation is expressed as $$E(t)'=1+mx(t)';$$

the error signal e(t) is expressed as $$e(t)=(E(t)'-E(t)^{0.5})^2;$$

the adaptive filter coefficient update term $\Delta a_m(t)$ is expressed as $$\Delta a_m(t) = -e(t)/a_m(t) = -2(E(t)' - E(t)^{0.5})x(t-m);$$ and the adaptive filter coefficient $a_m(t+1)$ is expressed as $$a_m(t+1) = a_m(t) + \beta\Delta a_m(t),$$

where the audio input signal is x(t), the first envelop signal is E(t), $a_m(t)$ is the adaptive filter coefficient of the previous stage, m is a modulation index and, β is an adaptive coefficient.

11. The method in accordance with claim 9, further comprising subjecting the ultrasonic signal to a non-linear demodulation in an air to convert the ultrasonic signal to an acoustic audio output.

12. The method in accordance with claim 9, wherein the inverse filter is calculated from a frequency characteristic of the ultrasonic converter obtained by modeling the ultrasonic converter with a predetermined filter.

* * * * *